United States Patent
Williamson

(10) Patent No.: US 9,694,424 B2
(45) Date of Patent: Jul. 4, 2017

(54) APPARATUS FOR CUTTING MATERIAL AND METHOD

(71) Applicant: Navarro IP, LLC, Geronimo, TX (US)

(72) Inventor: Kirk Ernest Williamson, Geronimo, TX (US)

(73) Assignee: Navarro IP, LLC, Geronimo, TX (US)

( * ) Notice: Subject to any disclaimer, the term of this patent is extended or adjusted under 35 U.S.C. 154(b) by 157 days.

(21) Appl. No.: 14/310,921

(22) Filed: Jun. 20, 2014

(65) Prior Publication Data
US 2015/0367420 A1  Dec. 24, 2015

(51) Int. Cl.
B23B 5/14 (2006.01)
B23D 45/12 (2006.01)
B23D 47/04 (2006.01)

(52) U.S. Cl.
CPC .............. *B23B 5/14* (2013.01); *B23D 45/124* (2013.01); *B23D 47/04* (2013.01); *Y10T 82/16* (2015.01); *Y10T 82/16016* (2015.01); *Y10T 82/2514* (2015.01); *Y10T 82/2593* (2015.01)

(58) Field of Classification Search
CPC .................. B23B 5/14; Y10T 82/16229; Y10T 82/16442; Y10T 82/16426; Y10T 82/16967; Y10T 82/16; Y10T 82/2593; Y10T 82/2514; Y10T 83/0596; B23D 45/124; B23D 47/04; B23D 47/047045
USPC ....................................... 30/93, 102
See application file for complete search history.

(56) References Cited

U.S. PATENT DOCUMENTS

| 1,986,587 A | * | 1/1935 | Ludington | ................. B23B 5/14 82/101 |
| 2,106,321 A | * | 1/1938 | Guertin | ................... B27G 19/02 83/440.2 |
| 3,499,178 A | * | 3/1970 | Blake | ...................... B23B 5/168 470/58 |

(Continued)

FOREIGN PATENT DOCUMENTS

| DE | 2553485 A1 | * | 6/1977 | ........... B23D 45/124 |
| DE | 2709024 A1 | * | 9/1978 | ........... B23D 45/124 |

(Continued)

OTHER PUBLICATIONS

Description: EP 2647457 Al available at http://translationportal.epo.org/emtp/translate/?ACTION=description-retrieval&COUNTRY=EP&ENGINE=google&FORMAT=docdb&KIND=A1&LOCALE=en_EP&NUMBER=2647457&OPS=ops.epo.org/3.1&SRCLANG=de&TRGLANG=en (last visited Jun. 20, 2016).*

*Primary Examiner* — Sunil K Singh
*Assistant Examiner* — Ryan Rufo

(57) ABSTRACT

A cutting apparatus, for cutting a material, comprising a chuck for holding and rotating material, wherein the chuck can rotate about an axis of rotation and can be movable along the axis of rotation. The cutting apparatus further comprises a cutting element for cutting a material, and a first plurality of rotating elements for supporting the material during cutting operations. The cutting element can be movable vertically for positioning the cutting element adjacent to the material to be cut, and the first plurality of rotating elements can be movable vertically to align with the material. A method for cutting a material comprises the steps of positioning the material on a plurality of rotating members, moving the plurality of rotating members vertically, grip- (Continued)

ping the material with the chuck, rotating the chuck to rotate the material, and cutting the material with a cutter.

23 Claims, 12 Drawing Sheets

(56) References Cited

U.S. PATENT DOCUMENTS

| | | | | |
|---|---|---|---|---|
| 3,852,917 | A * | 12/1974 | McKown | B23D 45/124 266/54 |
| 3,857,207 | A | 12/1974 | Avrutin et al. | |
| 3,861,254 | A * | 1/1975 | Stoffels | B65H 16/06 82/101 |
| 3,985,051 | A * | 10/1976 | Brown | B23B 5/168 407/31 |
| 4,036,092 | A | 7/1977 | Kaltenbach | |
| 4,138,911 | A * | 2/1979 | Namiguchi | B23D 21/08 82/101 |
| 4,369,603 | A | 1/1983 | Gebel et al. | |
| 4,517,867 | A * | 5/1985 | Fuminier | B23D 21/00 30/94 |
| 4,546,681 | A * | 10/1985 | Owsen | B23Q 1/76 294/116 |
| 4,949,605 | A | 8/1990 | Geller et al. | |
| 5,027,681 | A * | 7/1991 | Hyvarinen | B23D 45/046 30/94 |
| 5,458,031 | A * | 10/1995 | Wolff | B26D 3/164 82/101 |
| 5,894,771 | A * | 4/1999 | Braun | B23B 5/14 82/113 |
| 6,101,910 | A * | 8/2000 | Nicolai | B23D 21/14 82/101 |
| 7,398,716 | B2 * | 7/2008 | Quigley | B26D 3/161 82/101 |
| 7,886,640 | B2 | 2/2011 | Liao | |
| 2003/0226432 | A1 | 12/2003 | Majeski | |
| 2007/0028451 | A1* | 2/2007 | Kaehr | B23B 5/16 30/102 |
| 2014/0109734 | A1* | 4/2014 | Perez | B23Q 1/76 82/152 |
| 2014/0174266 | A1* | 6/2014 | Tancredi | B26D 3/16 82/52 |
| 2015/0158099 | A1* | 6/2015 | Micali | B23D 79/023 83/39 |

FOREIGN PATENT DOCUMENTS

| | | | | |
|---|---|---|---|---|
| DE | 4013470 A1 | * | 10/1991 | B23D 45/124 |
| EP | 2647457 A1 | * | 10/2013 | B23D 45/124 |
| GB | 735975 A | * | 8/1955 | B23D 45/124 |
| WO | WO 81/00821 A1 | * | 4/1981 | B23D 45/124 |

* cited by examiner

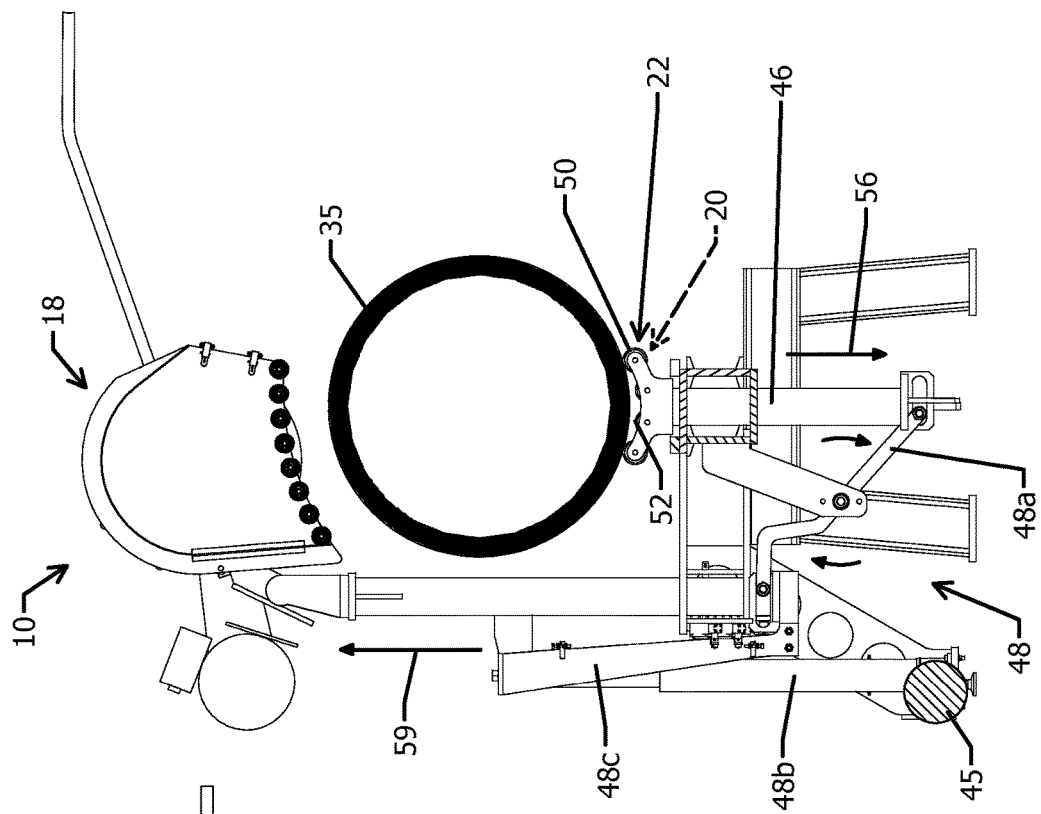
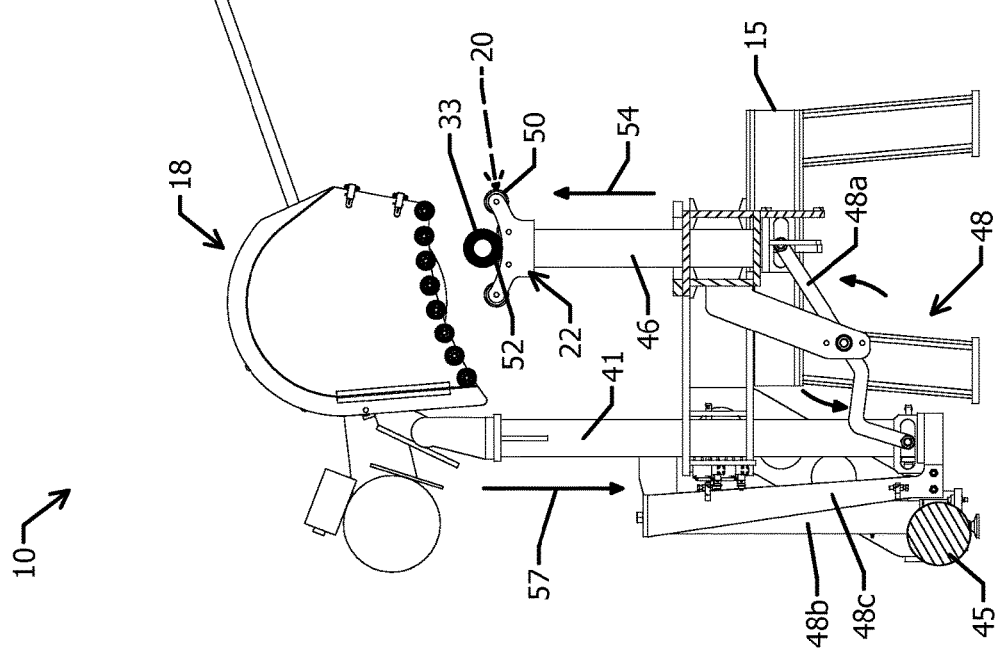

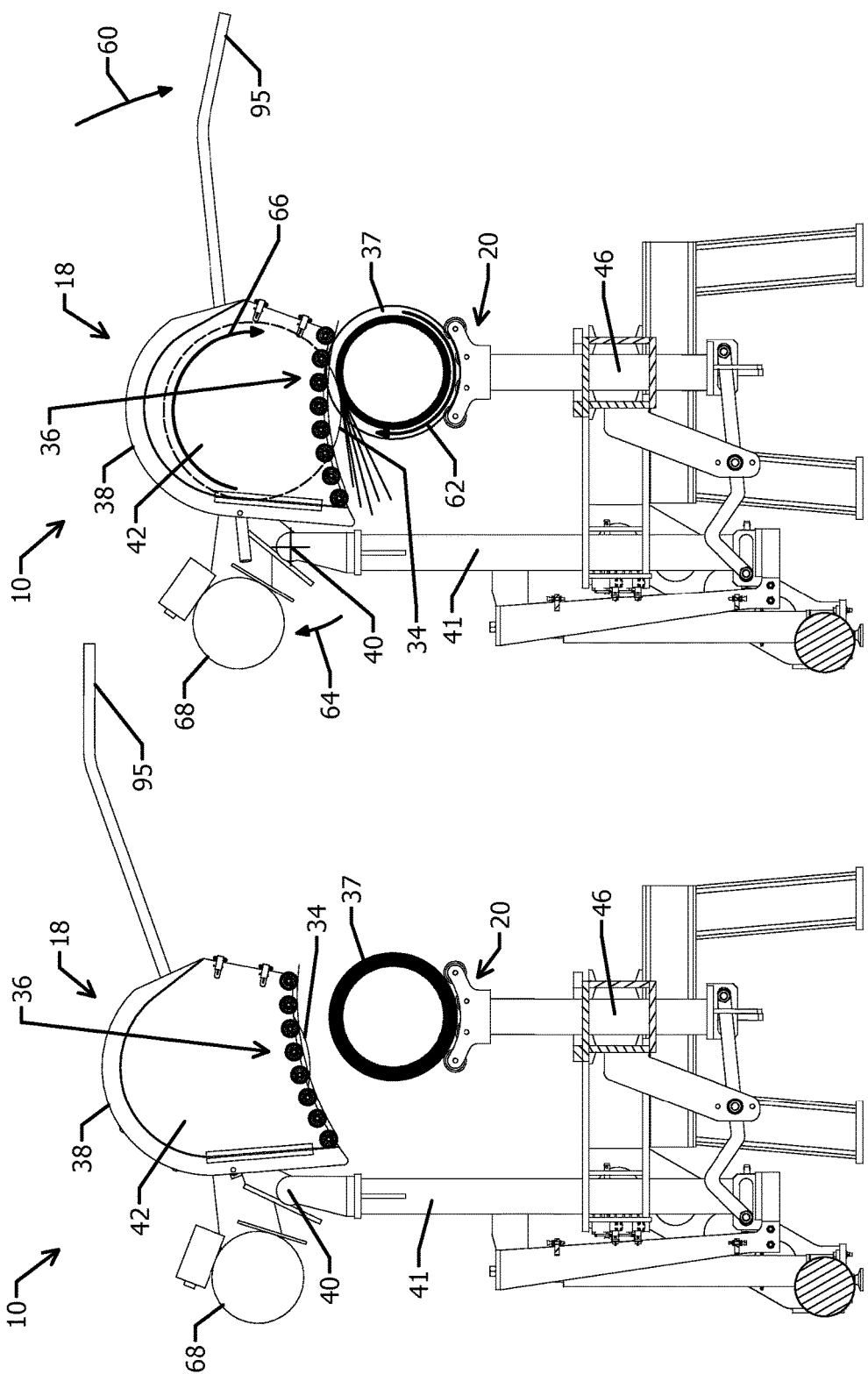

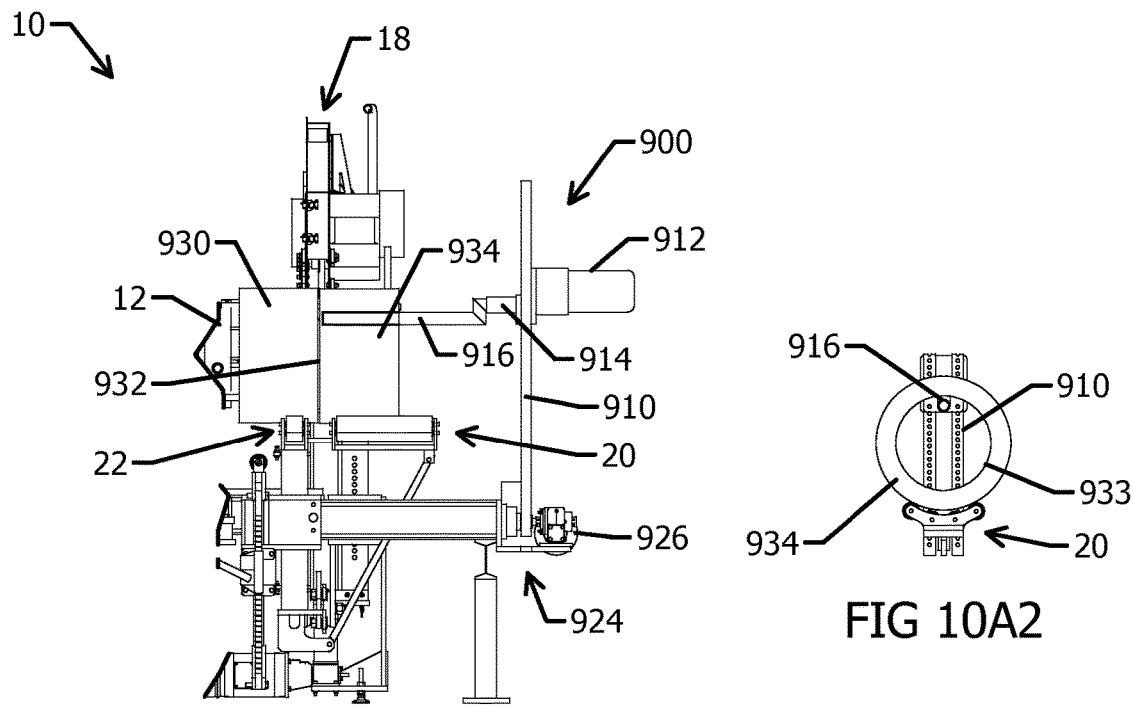
FIG 10A1
FIG 10A2
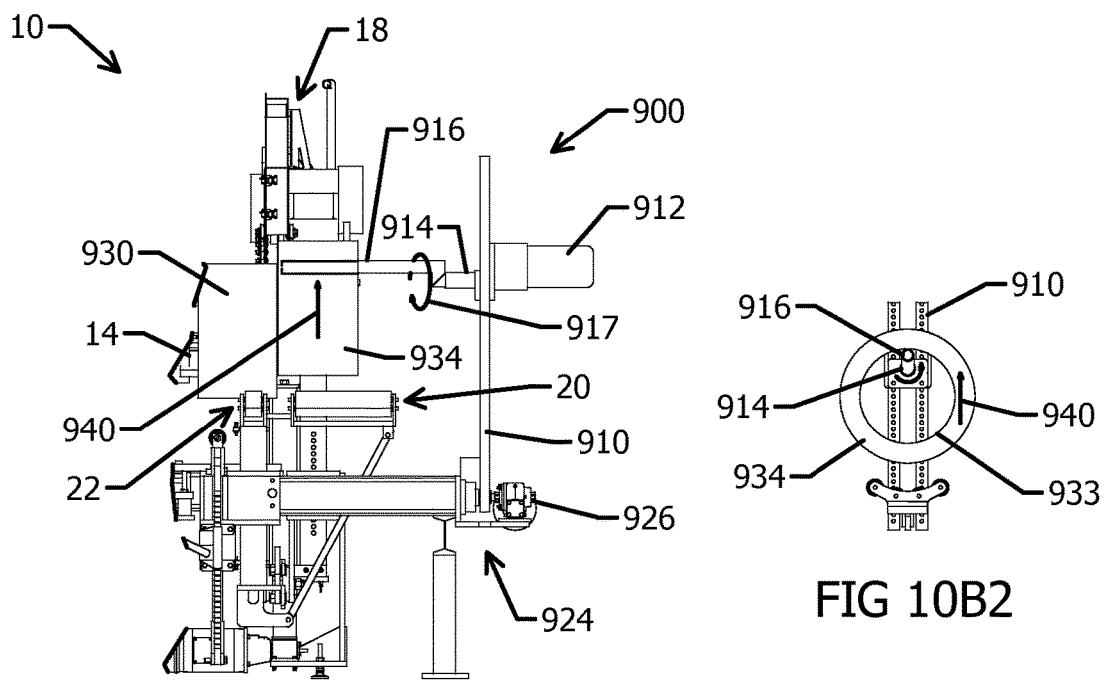
FIG 10B1
FIG 10B2

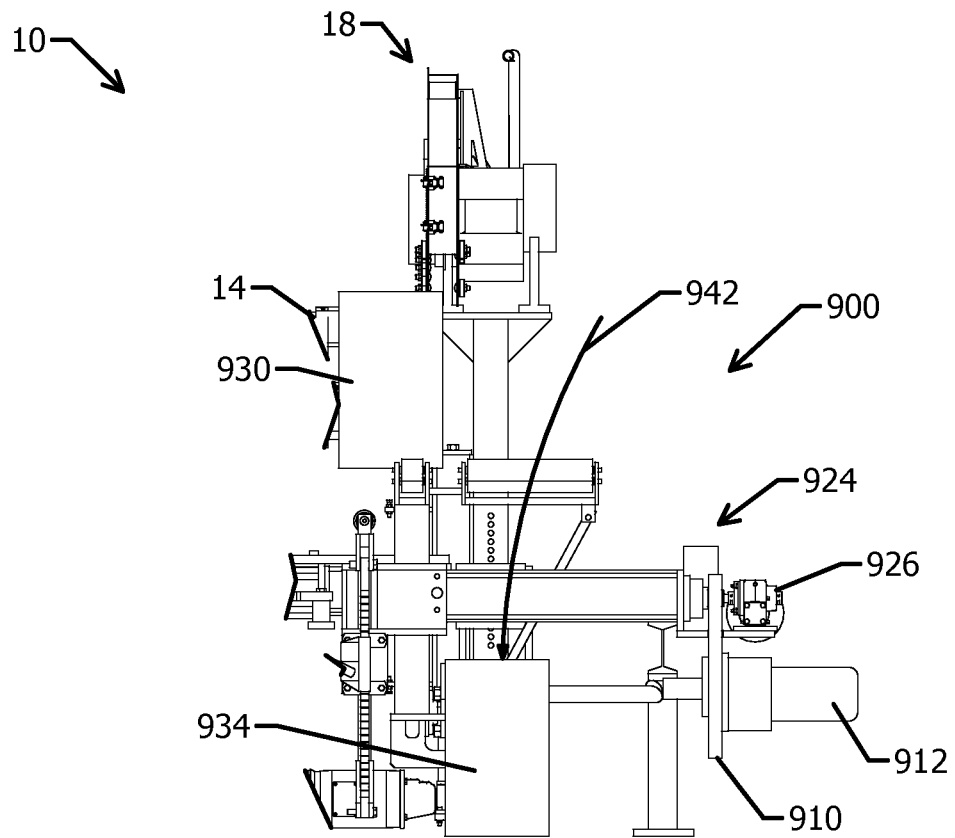
FIG 10C1
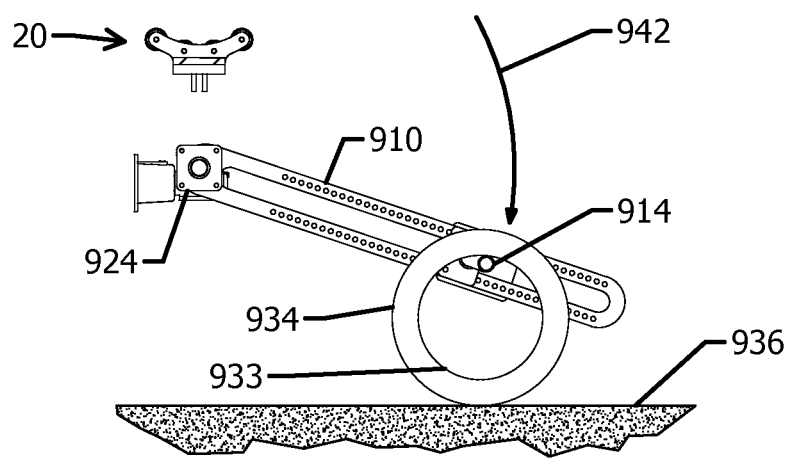
FIG 10C2

APPARATUS FOR CUTTING MATERIAL AND METHOD

FIELD

The embodiments of the present invention relate generally to the field of cutting machines and methods and, more particularly, to rotating cutting machines for cutting cylindrical objects and other materials.

BACKGROUND

Conventional saws include a blade or cutter for cutting material while the material, to be cut, generally rests in a holding fixture as the cut is taking place. In the typical existing saw, the material is not in motion while the cut is occurring. This typically means that the blade or cutter and guards are configured to be able to extend the entire diameter of the material to completely cut it. For example in one configuration, a twenty-four inch diameter steel bar could then require at least a forty-eight inch blade on an abrasive saw or throat in a band saw. Therefore, such a saw configuration requires that the blade or throat be at least twice the diameter of the material to be cut.

In another configuration, an abrasive saw rotates around the center on a shaft while the band saw rotates in a loop on pulleys. A vertical band saw could then cut a twenty-four inch diameter piece with at least a twenty-four inch diameter throat on the saw. As the power requirements increase with the size of the blade, saws with a twenty-four inch capacity often require a 100 HP motor.

Also, the existing saws are frequently supplied with coolant to reduce the temperature induced in the material being cut, as the cutting action by these saws can damage the material during routine cutting operations, particularly if there is no accounting for the temperature effects.

Other saw designs include a self-centering chuck, also known as a scroll chuck, which includes dogs (usually called jaws) interconnected via a scroll gear (scroll plate), to hold onto a tool or workpiece. Because the self-centering chucks often have three jaws, the term three-jaw chuck, without other qualification, is often understood by machinists to mean a self-centering three-jaw chuck. The term universal chuck also refers to a self-centering, three-jaw chuck. These chucks are best suited to grip circular or hexagonal cross-sections when very fast, reasonably accurate (±0.005 inch [0.125 mm] TIR) centering is desired.

Other rotating cutting structures have been used in the industry, as disclosed in U.S. Pat. No. 3,857,207, U.S. Pat. No. 4,036,092, U.S. Pat. No. 4,369,603, U.S. Pat. No. 4,949,605, U.S. Pat. No. 6,330,848, U.S. Pat. No. 7,886,640, and U.S. Publication No. 20030226432, and discussed below.

U.S. Pat. No. 3,857,207, issued Dec. 31, 1974, to Avrutin, et al., discloses a device comprising a rotor having an end adapted to secure a workpiece. The rotor has opposing circular supporting surfaces which are flat, parallel and perpendicular to the axis of its rotation. Each of the supporting surfaces is connected to the corresponding supporting surface of the casing and is separated from the latter by a layer of working medium supplied under pressure. The rotor is connected to the drive by means of members whose stiffness in the axial direction is negligibly small as compared to the stiffness of the working medium layer, thus reducing to a minimum effect produced by axial vibrations of the drive on the axial accuracy of the rotor rotation.

U.S. Pat. No. 4,036,092, issued Jul. 19, 1977, to Kaltenbach, discloses a table-mounted circular saw. A support has portions which define a working plane, and an arm is pivotally mounted on this support at one end, and the arm carries a circular saw blade which can be moved toward and away from the working plane as the arm is pivoted. Cooperating mechanical elements are provided on the arm and on the support and are power-driven so as to pivot the arm with the blade towards and away from the working plane. These mechanical elements may be rack and pinion constructions or they may be screw spindle and spindle-nut constructions.

U.S. Pat. No. 4,369,603, issued Jan. 25, 1983, to Gebel, et al., discloses a method for positioning and rotating a workpiece shaped like a body of rotation and having a plane face, comprising the following steps: positioning the workpiece on axial and radial supports; transmitting the torque from a rotary driving member to the workpiece due to the forces of friction developed therebetween; and feeding ultrasonic mechanical vibrations to at least one of the supports, said vibrations being fed to any one of the supports in the direction substantially parallel to or at an angle not exceeding 10 degrees with the line of contact between the workpiece and said support. An arrangement implementing this method comprises separate axial and radial supports, the radial support being constituted by two parts spaced apart through a certain angle and having the profile, in the working portion, congruent to the cylindrical profile of the workpiece surface. The arrangement is further provided with a frictional rotary driving member contacting with the workpiece to be machined, and with an electromechanical magnetostriction converter operating within the ultrasonic range and having a waveguide rigidly connected to both converter and support, mechanical vibrations being fed thereto.

U.S. Pat. No. 4,949,605, issued Aug. 21, 1990, to Geller, et al., discloses an apparatus for cutting a workpiece includes a rotatable blade and a rotatable workpiece holder mounted on a pivotal swing arm and rotated in a selected direction by drive elements. The swing arm pivots downward into an engagement position so that the workpiece is urged into resilient contact with the cutting surface, and radial irregularities of the surface of the workpiece are resiliently tracked by the pivoting swing arm.

U.S. Pat. No. 6,330,848, issued Dec. 18, 2001, to Nishio, et al., discloses a circular saw cutting machine. In the operation of cutting a metallic work material, if the rotation of an electric motor 21 is reduced by a reduction gear mechanism including a gear mechanism and transmitted to a main shaft and the metallic work material is cut by a circular saw attached to one end of the main shaft, the moment of inertia I of the main shaft while an outside diameter of said circular saw is D (mm), the number of revolution is N (rpm) and a cutting force per tooth as a component of force in tangential direction is F (kgf). By so setting, the initial cut positions of the work material and in a region in which the number of cutting related teeth Zi is 1.0 or less at the final cut positions, the moment of inertia is high compared with a cutting torque applied to the main shaft by intermittent cutting resistance, so that the rotational variation of the main shaft is very small. Likewise, in a region in which Zi is high, reproduced chatter is suppressed.

U.S. Pat. No. 7,886,640, issued Feb. 15, 2011, to Liao, discloses a rotational cutting machine which has a base that includes a first motive power source to rotate the cutting blade. Near the cutting blade is a fixing tool that tightly holds an object to be cut, and on the side the fixing tool is a second motive power source to turn the fixing tool together with the object to be cut.

U.S. Patent Application Publication No. 20030226432, published Dec. 11, 2003, to Majeski, discloses an apparatus for manufacturing a plurality of cores from a workpiece. In one embodiment, the apparatus includes a support structure for supporting the workpiece. A cutting assembly includes an arbor with a plurality of cutting blades spaced equidistant apart. Either one, or both, of the support structure and the cutting assembly may be moved toward the other, such that the cutting assembly engages the workpiece. As the cutting assembly engages the workpiece to cut the workpiece, the workpiece is rotated so that the blades of the cutting assembly cut the workpiece into the plurality of cores.

As discussed above, the above art is complicated and does not provide an axially moveable chuck to rotate the material in conjunction with a laterally moveable cutting element. The present invention permits a smaller saw blade to be utilized, reduces the horsepower required to a fraction of that previously required, and inherently provides such improved temperature control that prior art temperature controls may not be necessary at all. Consequently, there remains a need for an improved cutting apparatus. Those skilled in the art have long sought and will appreciate the present invention which addresses these and other problems.

SUMMARY

The present disclosure is related generally to a cutting apparatus for cutting a material, which comprises a frame assembly, a rotating chuck for holding and rotating the material to be cut, a material cutter that can be mounted to the frame assembly, and a plurality of rollers that can be usable for supporting the material during cutting operations. In an embodiment of the cutting apparatus, the chuck can be mounted to the frame assembly and can move axially along the axis of rotation. The plurality of rollers can be mounted to the frame assembly and can be vertically movable to accommodate different sizes of the material.

In an embodiment, the plurality of rollers can include a first group of rollers and a second group of rollers, wherein the first group of rollers can be axially spaced from the second group of rollers. In an embodiment of the cutting apparatus, the first group of rollers can be positioned on a side of the material cutter to support a portion of the material that is held by the rotating chuck, and the second group of rollers can be positioned on an opposite side of the material cutter to support a portion of the material that is severed.

The present disclosure is further directed to a cutting apparatus for cutting a material, comprising a chuck for holding and rotating the material, a cutting element for cutting the material, and a first plurality of rotating elements for supporting the material during cutting operations. In an embodiment of the cutting apparatus, the chuck can rotate about an axis of rotation and can be movable along the axis of rotation. The cutting element can be movable vertically for positioning the cutting element adjacent to the material for cutting the material, and the first plurality of rotating elements can be movable vertically to align the material with the chuck.

An embodiment of the cutting apparatus can comprise a support member movable vertically into contact with the material to support the material as the material is moving axially along the axis of rotation, and the support member can be positioned between the chuck and the plurality of rolling members. In an embodiment, the first plurality of rotating elements can be positioned between the chuck and the cutting element. The cutting apparatus can further comprise a second plurality of rotating elements spaced from the first plurality of rolling elements, wherein the second plurality of rotating elements can be positioned on a side of the cutting element opposite the first plurality of rotating elements.

The present disclosure is further directed to a method for cutting a material, in which the method can comprise the steps of providing a cutting apparatus for cutting the material, wherein the cutting apparatus comprises a rotatable chuck, a cutter, and a plurality of rotating members. The method can further include the steps of positioning the material on the plurality of rotating members, moving the plurality of rotating members vertically to align the material with a rotatable chuck, gripping the material with the rotatable chuck, rotating the rotatable chuck to rotate the material about an axis of rotation as the material is supported by the plurality of rotating members, and cutting the material with the cutter, wherein a portion of the material remains gripped and another portion of the material is severed.

In an embodiment, the method for cutting a material can include moving the rotatable chuck axially along the axis of rotation to move the material axially along the axis of rotation to position the material in a desired position relative to the cutter.

Embodiments can include moving a support member vertically into contact with the material to support the material as the material is moving axially along the axis of rotation, and moving the cutter vertically to position the cutter adjacent to the material for cutting. The support member can comprise at least one roller, and the support member can be positioned between the chuck and the plurality of rotating members (e.g., rollers). In an embodiment, the support member can be movable to accommodate different sizes of the material that is being cut.

In an embodiment, the method of cutting a material can include supporting a gripped portion of the material by a first set of rotating members of the plurality of rotating members, and supporting a severed portion of the material by a second set of rotating members of the plurality of rotating members, wherein the second set of rotating members can be spaced from the first set of rotating members along the axis of rotation. This embodiment can further include the step of removing the severed portion of the material from the second set of rotating members.

The embodiments can include providing a guard or cover for the cutter, wherein the guard or cover comprises friction reducing elements (e.g., a plurality of rollers), and moving the cutter and the friction reducing elements into contact with the material as the material is rotating.

Embodiments of the apparatus and methods usable for cutting a material can include a material moving assembly, which can be positioned on an opposite side of the cutter from the chuck and which can comprise an arm. The arm can be insertable into an interior portion of the material, and the arm can be usable to lift or move the material, including the moving of a cut portion of the material away from a plurality of rotating members (e.g., rollers).

The foregoing is intended to give a general idea of the invention, and is not intended to fully define nor limit the invention. The invention will be more fully understood and better appreciated by reference to the following description and drawings.

BRIEF DESCRIPTION OF THE DRAWINGS

The accompanying drawings, which are incorporated in and constitute a part of this specification, illustrate an implementation of apparatus consistent with one possible embodiment of the present invention and, together with the detailed description, serve to explain advantages and principles consistent with the disclosure. It is to be understood that in some instances various aspects of the invention may be shown exaggerated or enlarged to facilitate an understanding of the invention. In the drawings:

FIG. 5A is an elevational view, partially in section, of a rotating cutting apparatus with a support roller for a relatively smaller tubular in lower vertical position in accord with one possible embodiment of the present invention.

FIG. 5B is an elevational view, partially in section, of a rotating cutting apparatus with a support roller for a relatively larger tubular in an upper vertical position in accord with one possible embodiment of the present invention.

FIG. 7A is an elevational view, partially in section, of a rotating cutting apparatus with a tubular material to be cut supported vertically moveable support roller prior to engagement with a rotating saw in accord with one possible embodiment of the present invention.

FIG. 7B an elevational view, partially in section, of a rotating cutting apparatus with a tubular material to be cut supported vertically moveable support roller after engagement with a rotating saw in accord with one possible embodiment of the present invention.

FIG. 10A1 is an elevational side view of a rotating cutting apparatus with a cut material handler supporting a cut tubular directly after a cut is made in accord with one possible embodiment of the present invention.

FIG. 10B1 is an elevational side view of a rotating cutting apparatus with a cut material handler supporting a cut tubular lifting the tubular after a cut is made in accord with one possible embodiment of the present invention.

FIG. 10C1 is an elevational side view of a rotating cutting apparatus with a cut material handler lowering the tubular to the floor after a cut is made in accord with one possible embodiment of the present invention.

FIG. 10A2 is an elevational front view of a cut material handler supporting a cut tubular supported by a vertical roller support directly after a cut is made in accord with one possible embodiment of the present invention.

FIG. 10B2 is an elevational front view of a cut material handler supporting a cut tubular lifting the tubular of a vertical roller support after a cut is made in accord with one possible embodiment of the present invention.

FIG. 10C2 is an elevational front view of a rotating cutting apparatus with a cut material handler lowering the tubular to the floor after a cut is made in accord with one possible embodiment of the present invention.

Figure 1A:
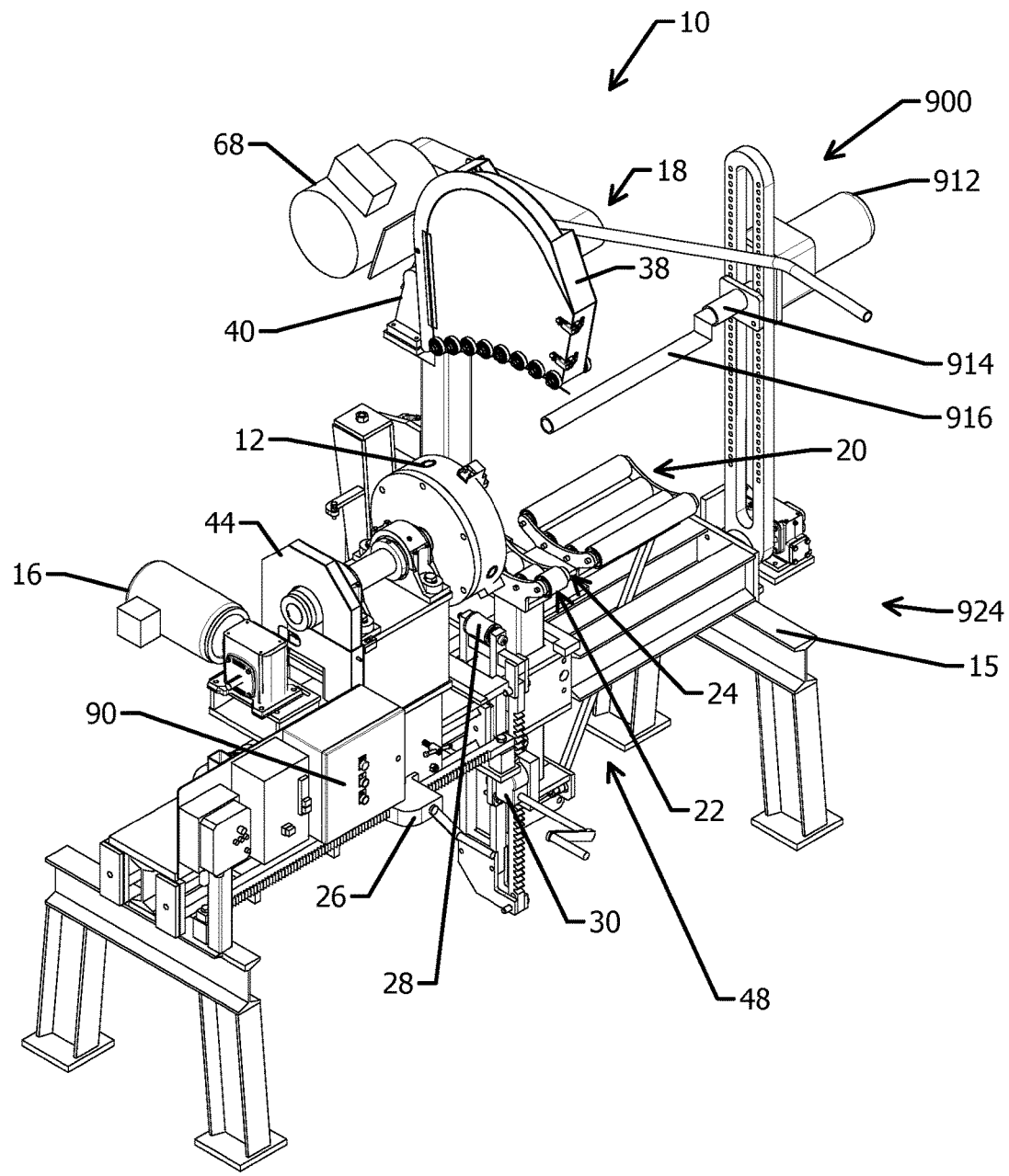
FIG. 1A is a front perspective view of a rotating cutting apparatus without a material to be cut in accord with one possible embodiment of the present invention.

The present embodiments are detailed below in reference to the figures as listed above.

DETAILED DESCRIPTION OF EMBODIMENTS

The present invention generally relates to a rotating cutting apparatus for cutting material, in which the cutting apparatus includes a spinning clamp, which can be referred to as a chuck in accord with one embodiment of the invention. However, before describing selected embodiments of the present disclosure in detail, it is to be understood that the present invention is not limited to the particular embodiments described herein. The disclosure and description herein is illustrative and explanatory of one or more presently embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The present invention relates generally to a cutting apparatus and methods usable to allow the rotating cutting apparatus to cut a piece of material, which can have a diameter that is more than twice as large as the diameter of the blade of the cutting apparatus. Rotating action of the material can result in the blade cutting on 360 degrees of the material, such that at the time the material is cut free, the blade of the cutting apparatus will have only reached the center or a lesser depth of the material.

Theoretically, a blade required to cut a twenty-four inch distance must be twenty-four inches because the center is reached when the blade has moved twelve inches. However, in practice this is not strictly true because an abrasive saw blade wears while it is cutting. Accordingly, to cut a twenty-four inch diameter a twenty-six inch blade might be required to account for blade wear.

However, if the material being cut is a tubular, the blade need only cut the wall of the tubular, if the tubular can be rotated, and the blade does not need to reach the center of the tubular. Accordingly, a blade having a diameter that is significantly smaller than the diameter of the tubular may be used to cut the tubular. The embodiments of the present invention provide for the rotation and movement of the material, such that the blade of the cutting apparatus can have a significantly smaller diameter than the diameter of the tubular or other cylindrical object, and the cutting of the large tubular or other cylindrical object can be completed with the smaller diameter blade.

Another significant advantage of the present invention is reduced horsepower required for cutting. The horsepower of for the cutting apparatus of the present invention can be significantly reduced, along with the blade size that is used. For example, the horsepower required to cut a twenty-inch blade may only be 15 HP, which reduces costs significantly.

Yet another advantage results from improved temperature control. Conventional saws are frequently supplied with coolant to reduce the temperature induced in the material being cut. In contrast, the cutting apparatus of the present invention enables the rotation of the material to be cut, and allows the material to cool during the time the portion of the material being cut is not under the cutting apparatus (i.e., saw). This prevents damage to the material being cut, such as cracks and heat hardening, and as such, may prevent the need for coolant.

Figure 1B:
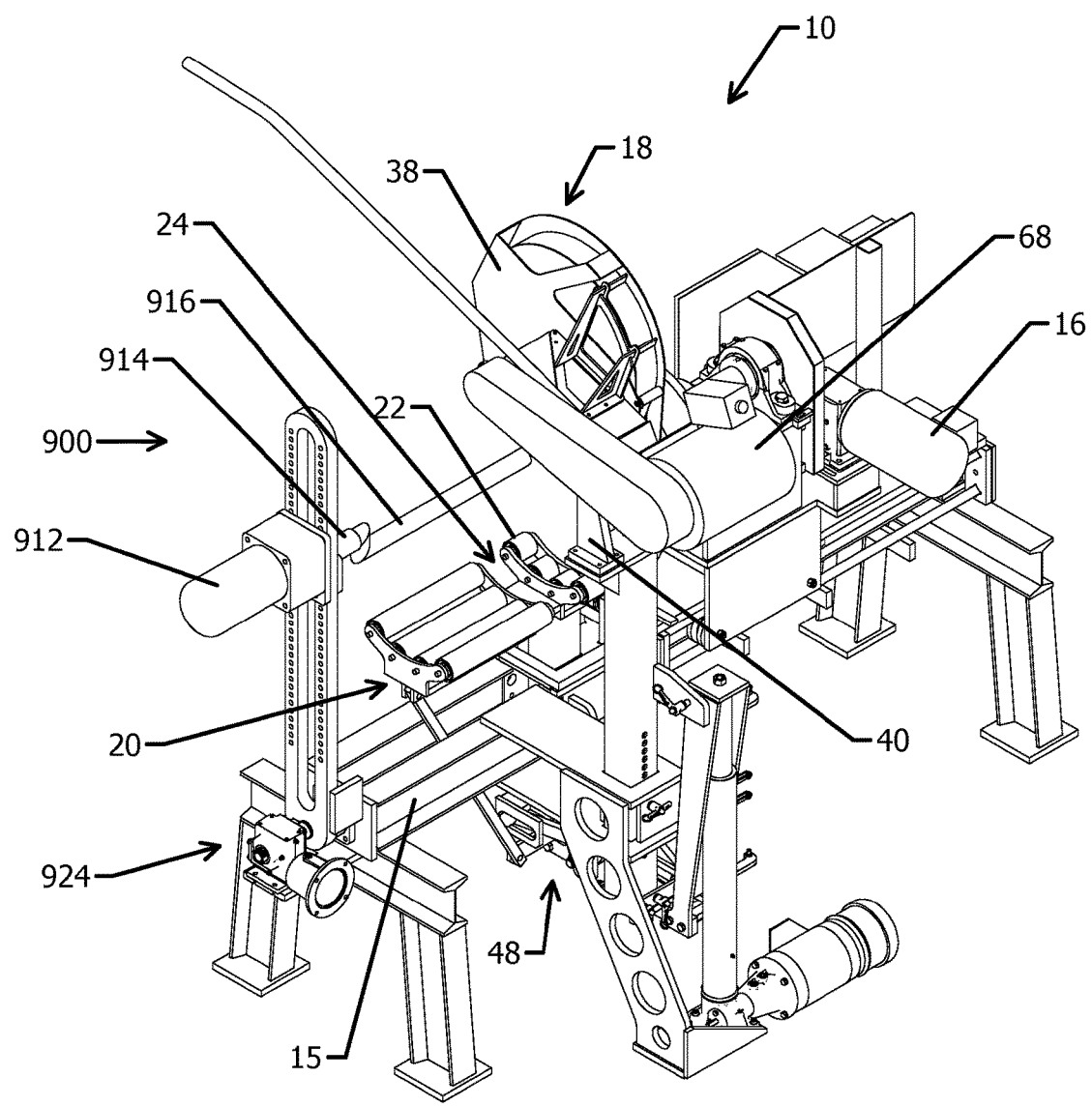
FIG. 1B is a rear perspective view of a rotating cutting apparatus without a material to be cut in accord with one possible embodiment of the present invention.

Referring now to FIG. 1A and FIG. 1B, the Figures depict a cutting apparatus 10 comprising a frame assembly 15 supporting a spinning clamp (e.g., rotating chuck) 12, a pivotal saw blade assembly (e.g., cutting assembly, cutter) 18, a material support mechanism 48, and a material handling mechanism 900. The frame assembly is depicted having four legs, which support the frame on the ground. Spinning clamp 12, which may be referred to as a chuck or rotating/rotatable chuck, contains jaws 14 (shown in FIG. 2) for holding the material to be cut. As explained in more detail below, the spinning clamp 12 provides axial adjustment capabilities for cutting apparatus 10, whereby the material (not shown) can be axially adjusted to a desired cutting plane, which extends along the projecting cutting plane of the pivotal saw blade assembly 18. An axial positioning mechanism can be utilized to move the spinning clamp 12 axially, wherein the spinning clamp 12 can be moved into a desired axial position. The jaws 14 can clamp to, and center with, a tubular material to be cut. Spinning clamp 12 is further depicted connected to the motor 16 with a rotating drive assembly 44.

Figure 2:
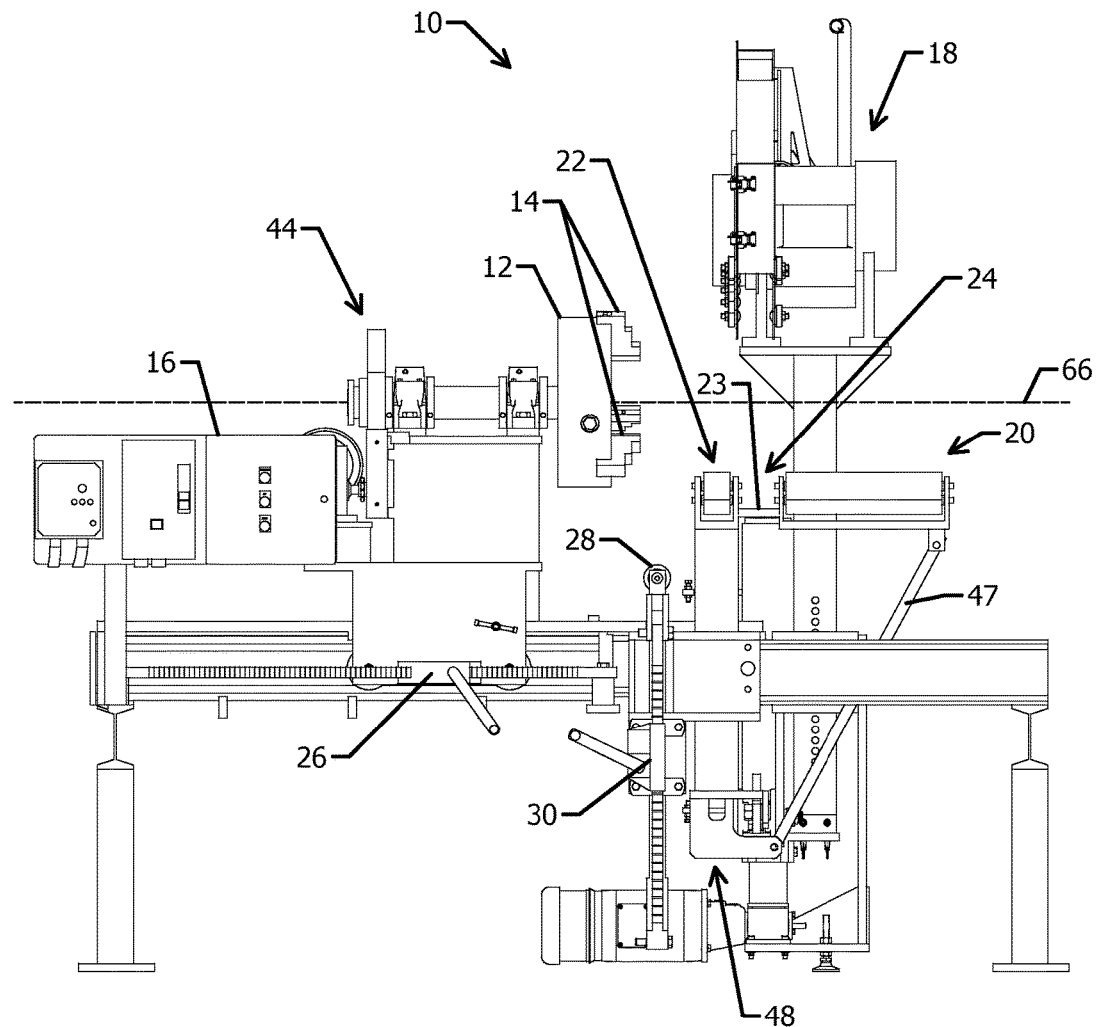
FIG. 2 is a side elevational view of a rotating cutting apparatus without a material to be cut in accord with one possible embodiment of the present invention.
Figure 8A:
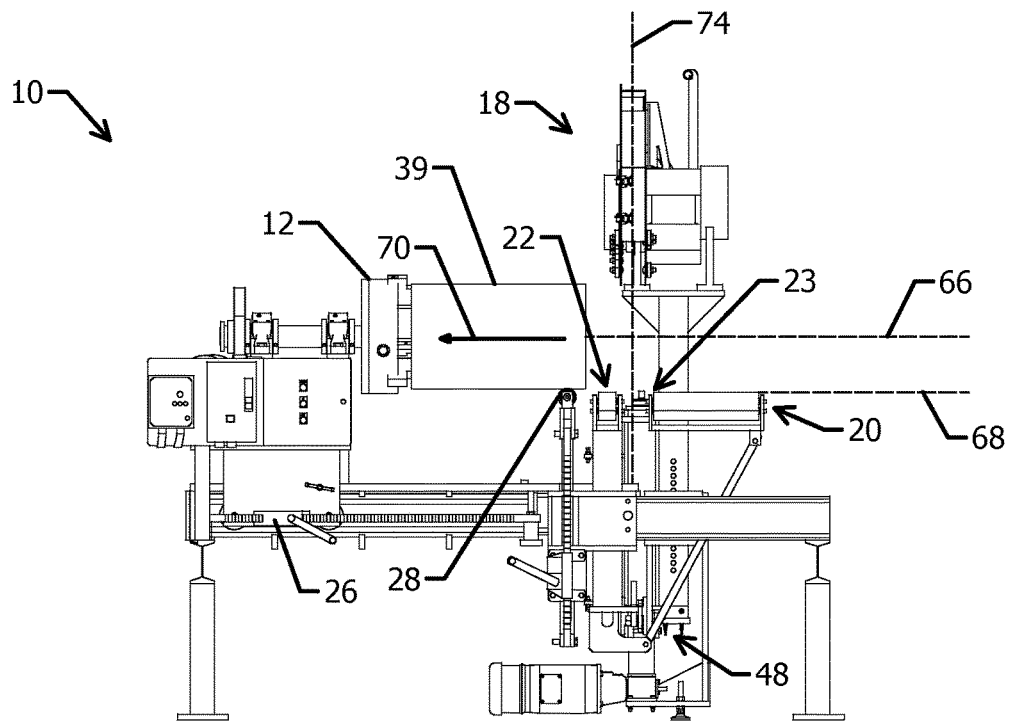
FIG. 8A is a side elevational view of a rotating cutting apparatus with a material to be cut clamped to an axially moveable spinning clamp prior to being moved axially for engagement with a rotating saw in accord with one possible embodiment of the present invention.
Figure 8B:
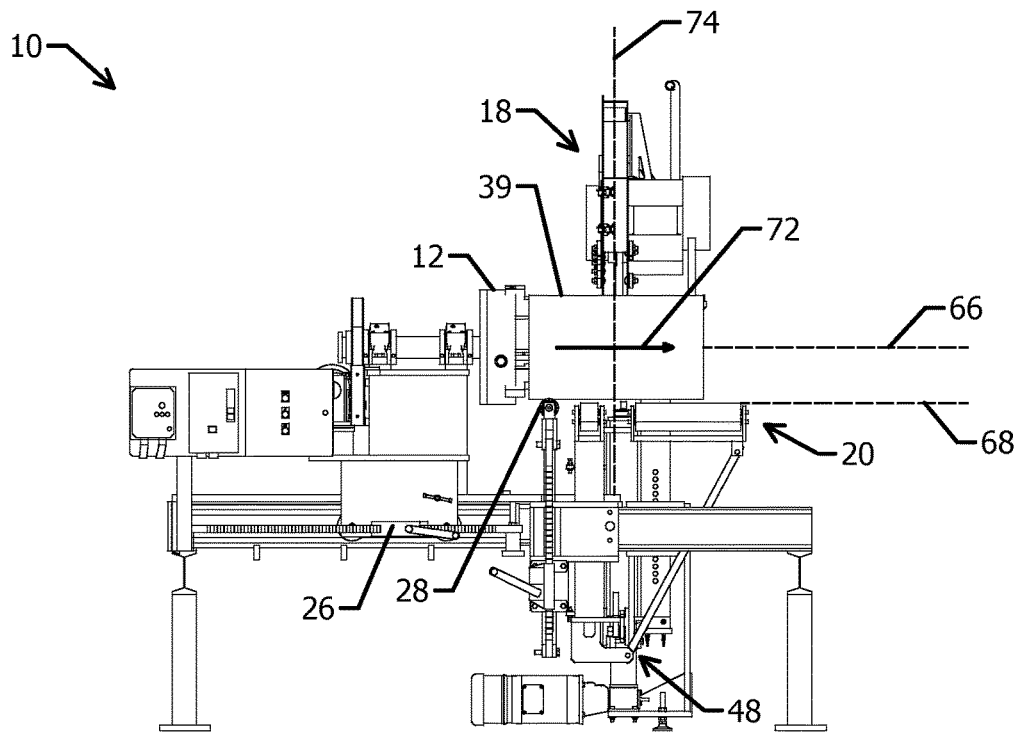
FIG. 8B is a side elevational view of a rotating cutting apparatus with a material to be cut clamped to an axially moveable spinning clamp after being moved axially to a desired axial position for engagement with a rotating saw in accord with one possible embodiment of the present invention.

Referring also to FIGS. 2, 8A and 8B, a plurality of vertically moveable roller supports 20, 22 can be utilized to support cylindrically shaped material 39 to be cut at a desired location, while the cylindrically shaped material 39 is rotating. The vertically moveable roller supports 20, 22 are shown oriented with their rotational axis 68 parallel to a rotational axis 66 of the cylindrical material 39. The first group of roller supports 22 is shown axially offset from a second group of roller supports 20 to create gap 24. Gap 24 is aligned with the cutting plane of the blade 34 (e.g., cutting element) of the rotating saw 18, which is shown located on the opposite side of the material 39 to be cut. In the depicted embodiment of the cutting apparatus, the roller supports 22, 20 can move vertically in tandem, as the base members holding the roller supports 22, 20 are shown in connection by a bracket 23 extending therebetween. After the material 39 is cut, roller supports 22 can support the uncut portion of the material that is still secured to spinning clamp 12. The second group of roller supports 20 can be longer than the first group of roller supports 22, as the first group of roller supports 20 can support the cut portion of the material 39. In other embodiments (not shown) of the cutting apparatus 10, the rollers 20, 22 can comprise different roller types, lengths, and/or quantities. For example, the rollers 20, 22 can comprise bunches or pluralities of smaller rollers, which can be arranged in line or in parallel configurations.

Referring again to FIG. 2, the cutting apparatus 10 can further comprise a vertically moveable orthogonal roller support 28, which can be usable to support a material to be cut, while the material and spinning clamp 12 are moved along axis 66 with the axial positioning mechanism 26. It will be appreciated that the axis of rotation of the roller support 28 is orthogonally and/or perpendicularly oriented with respect to the axis 66 of the material to be cut so that the material rolls along roller support 28, as shown in FIGS. 8A and 8B. Roller support 28 can be adjusted vertically, to make contact with and support the material, by utilizing vertical drive member 30 to move the support 28 the desired vertical position. Once the material to be cut is axially moved in the desired axial position, the roller support 28 can be lowered, allowing roller supports 20, 22 to support the material. In the embodiment depicted in FIG. 2, the vertical drive member 30 is shown comprising a hand crank; however, in other embodiments, the vertical drive member 30 can comprise any means for vertically adjusting the roller support 28, including an automated means, which can comprise electrical and/or hydraulic motors.

As depicted in FIGS. 2, 7A and 7B, a rotating drive assembly 44 can be utilized to slowly rotate the material to be cut 37, while the rotating saw blade 34 can be turned at a higher speed. A saw blade cover or the saw blade guard 38, which is pivotally attached to the support post 41 at pivot connection 40, can move upwardly, out of the way, with respect to the rotating saw blade, when rollers 36 contact the material 37 being cut. Guard 38 and the blade are shown supported by the support post 41, but the guard 38 can pivot about pivot connection 40, allowing the guard 38 to rotate and move upwardly with respect to the blade 37 during the cutting operations.

Figure 3:
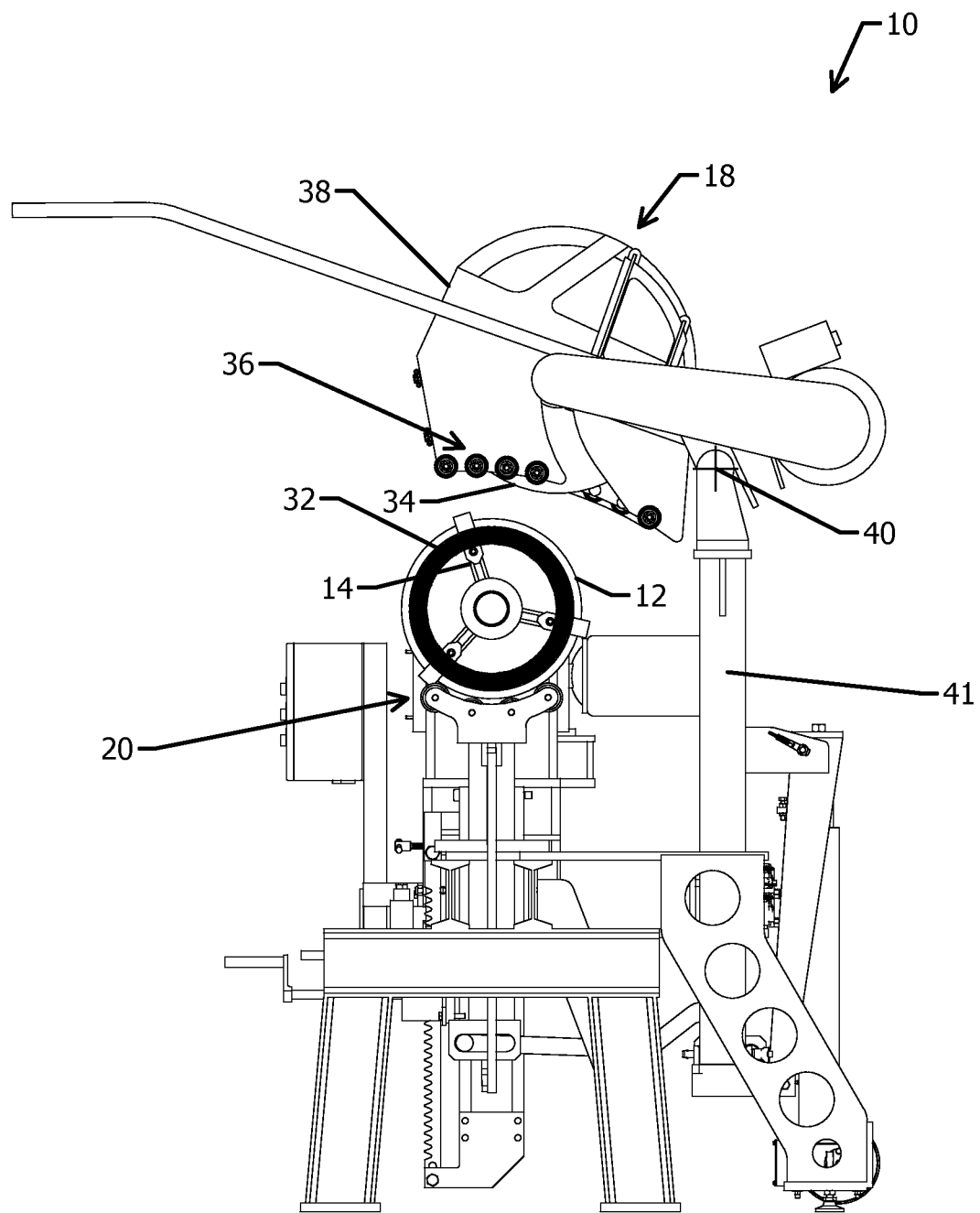
FIG. 3 is a front elevational view of a rotating cutting apparatus with a tubular to be cut in accord with one possible embodiment of the present invention.

Referring again to FIGS. 1A, 1B, and 10A1-10C1, a non-limiting example of cut material handler 900 is shown, wherein the handler 900 can be utilized to remove cut portion 934 of material from cutting apparatus 10. Shaft 916 is shown mounted at an offset from motor output shaft 914 of motor 912. Motor output shaft 914 can be rotated about one-half turn (i.e., 180 degrees) whereupon shaft 916 can be moved to a second vertical position, depicted in FIG. 10B1. In the second vertical position, shaft 916 can engage the interior surface of the cut portion 934 of the material to vertically raise the cut portion 934. Subsequently, one end of an arm 910 is shown connected to a gear box 924, which can be rotated by a motor to rotate the arm 910 downwardly allowing the cut portion 934 of the material to be laid on the floor, a support rack, or a transport means. The cut portion of the material can be very heavy, which would otherwise require the use of a crane to move the cut portion 934 to a desired location. Other types of cut material handlers (e.g., material moving assemblies) could be utilized to handle other types of cut material portions Referring now to FIG. 3, showing a front elevational view of cutting apparatus 10 with the material 32 being clamped to spinning clamp 12. The material 32 is shown comprising a tubular secured by jaws 14, of the spinning clamp 12, on one end and supported on an opposite end by roller supports 20. Rotating saw blade 34 is shown mounted to the support post 41 and covered by the guard 38 of rotating saw assembly 18. Rotating saw assembly 18 can rotate about the pivotal connection 40, allowing the blade 34 to move vertically with respect to the material 32. When rollers 36, positioned adjacent to the open end of the guard 38, contact the material 32, the guard 38 can remain stationary as the blade 34 moves downwardly to cut the material 32.

Figure 4:
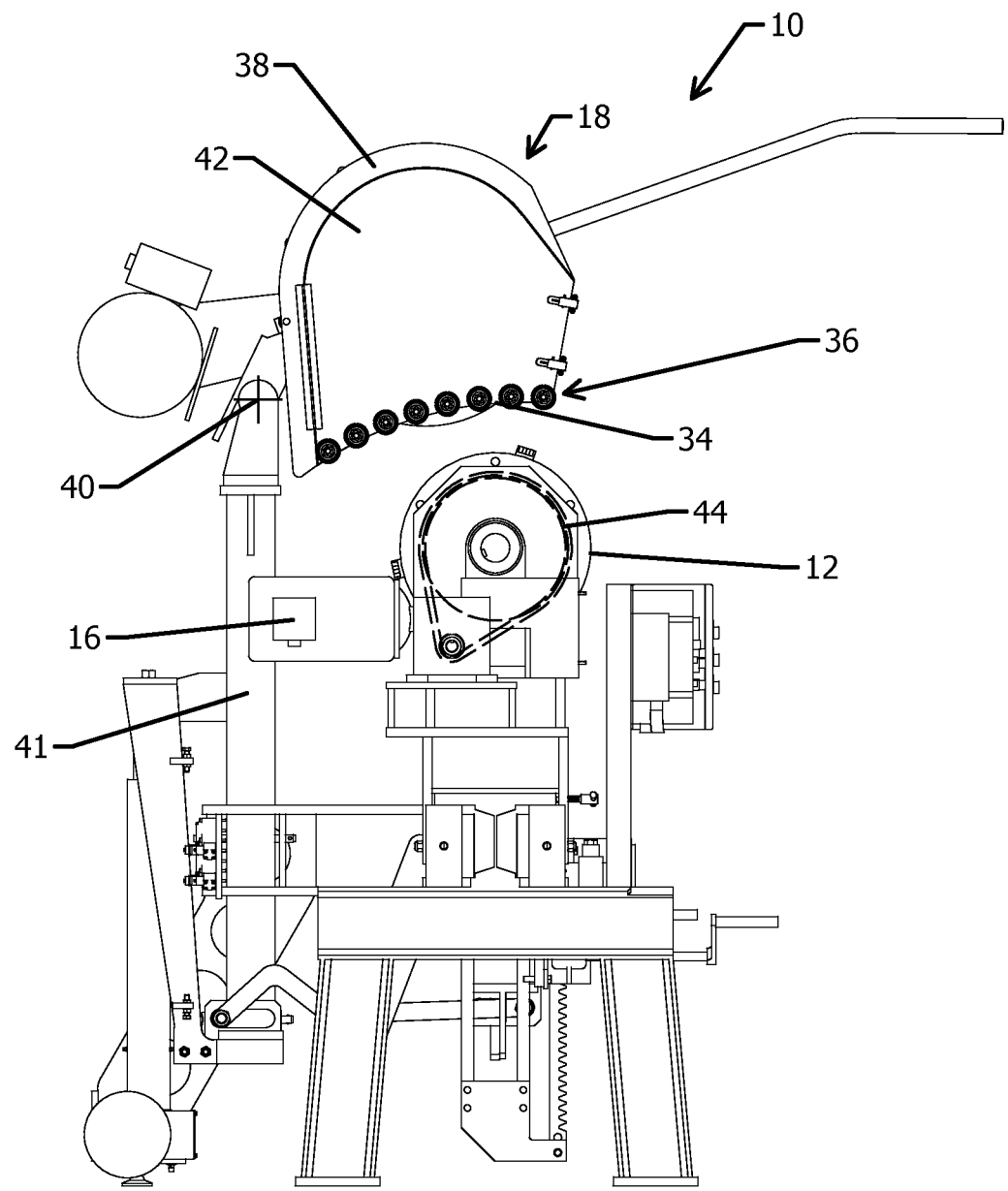
FIG. 4 is a rear elevational view, partially in hidden lines, of a rotating cutting apparatus in accord with one possible embodiment of the present.

FIG. 4 shows a rear elevational view of cutting apparatus 10, which is partially cut away and partially in dash. Rotating drive assembly 44 is showed utilizing an electrical motor 16 and a chain and sprocket assembly to rotate spinning clamp 12. In operation, the rotating drive assembly 44 can be utilized to rotate the material to be cut while rotating saw blade 34 is turned at a much higher speed, preferably but not necessarily in an opposite direction. The blade cover or the guard 38 is further depicted comprising a door or a movable cover plate 42, rotatably connected to the main portion of the guard 38, wherein the cover plate 42 can be opened to gain access to the blade 34. Guard 38 and blade 34 can independently pivot about the pivot connection 40 with respect to the support post 41.

FIGS. 5A and 5B show a rear elevational view of cutting apparatus 10, omitting several features for clarity. The Figures show the operation of rollers 22, which can comprise outer rollers 50 and inner rollers 52. FIG. 5A depicts material to be cut 33 comprising a small diameter tubular positioned at a sufficiently high vertical position to allow the cutting assembly (e.g., saw assembly) 18 to cut the material 33. The material is also shown being supported by inner rollers 52. FIG. 5B, on the other hand, shows the material 35 comprising a large diameter tubular supported by the outer rollers 52 at a lower height to position the upper wall of the tubular in close proximity to the saw assembly 18 for cutting. It should be noted that FIGS. 5A and 5B depict the axis of rotation 68 of rollers 50, 52 being parallel to the axis of rotation 66 of material 33, 35, which is shown with additional clarity in FIGS. 8A and 8B. Accordingly, rollers 50, 52 provide rolling support for material 33, 35 as the material is rotated by the spinning clamp 12, as shown in FIGS. 8A and 8B As further depicted in FIGS. 5A and 5B, the roller supports 22, 20 (rollers 20 are hidden from view) are mounted on a shaft 46, which can be vertically lowered and raised as indicated by arrows 54, 56 for maintaining the support rollers 22, 20; and therefore, the material 33, 35, at a desired vertical position for cutting by rotating saw assembly 18. The Figures further depict the rotating saw assembly 18 mounted on a support post 41, which can be vertically lowered and raised as indicated by arrows 57, 59 for maintaining the rotating saw assembly 18 at a desired vertical position for cutting.

The depicted embodiment of the cutting apparatus 10 is shown comprising a positioning mechanism 48 adapted for moving the support post 41 and the shaft 46 in conjunction with each other, but in opposite directions, to maintain the saw assembly 18 and the rollers 22, 20 at an essentially same distance from the axis 66 of the spinning clamp 12 (see FIGS. 8A and 8B). The positioning mechanism 48 is depicted comprising an electrical motor 45 mounted to the frame 15 of the cutting apparatus 10, wherein the motor 45 can actuate a linear actuator 48b, which is vertically positioned along the frame 15 of the cutting apparatus 10. The positioning mechanism 48 is further depicted comprising a pivoting lever arm 48a, wherein one end of the lever arm 48a is connected to the bottom of the shaft 46, the opposite end is connected to the bottom of the support post 41, and a central portion is pivotally connected to the frame 15. As the opposite ends of the lever arm 48a move in the opposite directions when the lever arm 48a is pivoted, the support post 41 and the shaft 46 also move in the opposite directions when the lever arm 48a is pivoted. FIGS. 5A and 5B further show the vertically moving portion or the rod of the linear actuator 48b being connected to the support post 41 by a linking member or a bracket 48c. Because the linear actuator 48b can be connected to the support post 41 and the support post 41 can be connected to the shaft 46 by the lever arm 48a, the linear actuator 48b can vertically move both the saw assembly 18 and the rollers 22, 20 simultaneously, but in opposite directions. Therefore, the motor 45 can be used to move the rotating saw assembly 18 in the downward direction 57 while simultaneously moving the rollers 22, 20 in the upward direction 54 to accommodate a smaller diameter material 33 positioned therebetween, as shown in FIG. 5A. The motor 45 can also be used to move the rotating saw assembly 18 in the upward direction 59 while simultaneously moving the rollers 22, 20 in the downward direction 56 to accommodate a larger diameter material 35 positioned therebetween, as shown in FIG. 5B.

Referring again to FIGS. 5A and 5B, the support post 41 can be disconnected from the bracket 48c, thereby allowing the support post 41 and, therefore, the saw assembly 18, to be moved independently of the shaft 46 and the rollers 22, 20. Furthermore, the bracket can be connected to the support post 41 at different positions along the support post 41 to control the initial distance of the saw assembly 18 from the axis 66 of the spinning clamp 12 (see FIGS. 8A and 8B). Therefore, the support post 41 can be connected to the bracket 48c so that the distance between the saw assembly 18 and the axis 66 is the same as the distance between the rollers 20, 22 and the axis 66. Also, the support post 41 can be disconnected from the bracket 48c, moved upwards, and then reconnected to the bracket 48c, whereby the distance between the saw assembly 18 and the axis 66 can be adjusted to be greater than the distance between the rollers 20, 22 and the axis 66. The latter setting can result in the rollers 20, 22 coming into contact with the material 33, 35 while the saw apparatus 18 is positioned at a desired proximity above the material 33, 35, as depicted in FIGS. 5A and 5B.

Referring again to FIGS. 8A and 8B, prior to cutting operations and once the material 39 has been connected to the spinning clamp 12, the positioning mechanism 48 can be used to raise the rollers 20, 22 into contact with the bottom portion of the material to vertically support the material. As described above, when the linear actuator 48b is actuated, the rollers 20, 22 move in the upward direction toward the material 39 and, simultaneously, the rotating saw assembly 18 moves in the downward direction toward the material 39, until both the saw assembly 18 and the rollers 20, 22 are in contact with or in close proximity to the material 39. Referring also to FIGS. 7A and 7B, the cutting apparatus 10 is shown comprising a saw assembly 18 that is pivotable about the support post 41. Therefore, during cutting operations, the saw assembly 18 can be moved to cut the material 37 by manually pulling on the handle 95 in the downward direction 60. In another embodiment (not shown) of the cutting apparatus 10, the saw assembly can be rotated about the support post by automated means, such as a fluid linear actuator, a fluid rotary actuator, an electrical motor, or by any other means known in the art. As the blade 34 cuts through the material 37 and moves downward, the blade guard 38, which can pivot independently from the blade 34, maintains constant position as the rollers 36 contact the material on one or both sides of the cut being made by the blade 34.

Referring again to FIG. 2, the support mechanism 48 is further depicted comprising a diagonal arm 47, which vertically supports support rollers 20. Similarly to the shaft 46, the bottom end of the diagonal arm 47 is connected to one end of the pivoting lever arm 48*a*, whereby the pivoting lever arm lifts the diagonal arm to lift the one side of the support rollers 20, opposite the connecting bracket 23.

Figure 6:
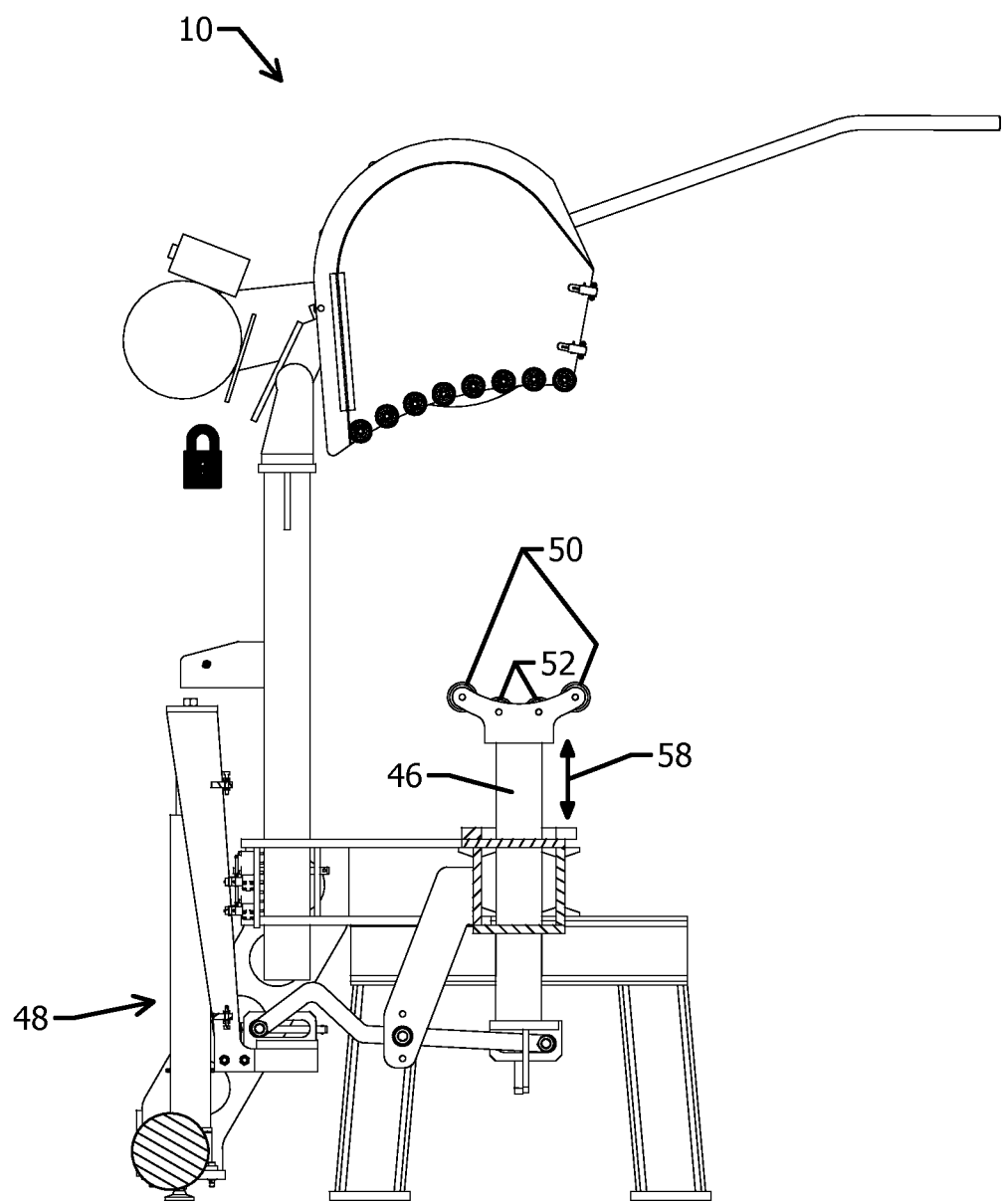
FIG. 6 is an elevational view, partially in section, of a rotating cutting apparatus with a vertically moveable support roller in accord with one possible embodiment of the present invention.

FIG. 6 shows a rear elevational view of cutting apparatus 10, omitting several features and the material to be cut for clarity. As noted above, inner and outer rollers 52, 50 are supported on shaft 46, which can be vertically lowered and raised as indicated by arrow 58. The support mechanism 48 is shown in an intermediate position, whereby the shaft is raised about half way to its highest position.

Referring now to FIGS. 7A and 7B, the Figures show a rear elevational view of cutting apparatus 10, while omitting several features for clarity, prior to and during cutting operations. In FIG. 7A, the rotating saw assembly 18 is positioned above material 37, comprising a tubular member, positioned on the rollers 20. As depicted in FIG. 7B, once the desired vertical height of the material 37 is achieved, the cutting operations can commence. Specifically, motor 68 can be utilized to rotate the saw blade 34 in a first direction as indicated by arrow 66. Rotating saw assembly 18 can then be pivoted about pivot joint 40, as indicated by arrows 60, 64, to lower the saw blade 34. Rollers 36 can then engage material 37, which causes the guard 38 to remain static as the saw blade 34 continues to cut and descend into the material 37. In the depicted embodiment, the saw blade 34 and the material 37 are rotated in the same direction, as indicated by arrows 66 and 62, respectively. Rotating the blade 34 and the material 37 in the same direction (e.g., clockwise) results in portions of the blade 34 and the material 37 moving in opposite directions at their point of contact. During cutting operations, the blade 34 can be lowered to cut through the wall of the material 37. As the material 37 is rotated, the material 37 can be cut along the entire circumference until a portion is completely severed. Due to rotation of the material 37, local heat generated during the cutting can be minimized. The rotation of the tube allows saw blades having relatively small diameters to completely sever larger sections of material.

FIGS. 8A and 8B illustrate axial adjustment capabilities of cutting apparatus 10 whereby material 39 can be axially moved to a desired cutting plane 74 defined by the projecting plane of the saw blade. As further depicted, the axial positioning mechanism 26 can be utilized to move the spinning clamp 12 along axis 66. Prior to cutting operations, the material 39, which can be clamped with the spinning clamp 12, can be adjusted axially as indicated by arrows 70, 72. In the depicted embodiment of the cutting apparatus 10, the axis of rotation 66 of material 39 is shown being parallel to the axis of rotation 68 of the roller supports 20. As depicted in FIG. 8B, axial positioning mechanism 26 is utilized to move material 39 toward the front of the cutting apparatus, as indicated by arrow 72, along the axis of rotation 66. Accordingly, the present invention can allow precise axial positioning of material 39 with respect to the cutting plane 74. During axial adjustments, the axial roller supports 28 vertically prop the material 39, while the material is moved horizontally along the axis of rotation 66. As further depicted in FIGS. 8A and 8B, the support rollers 22, 20 are axially separated along the cutting plane 74 to form a gap 23, allowing the saw blade to extend past the axis 68 of the support rollers 22, 20, yet avoid contact with the support rollers 22, 20.

Figure 9A:
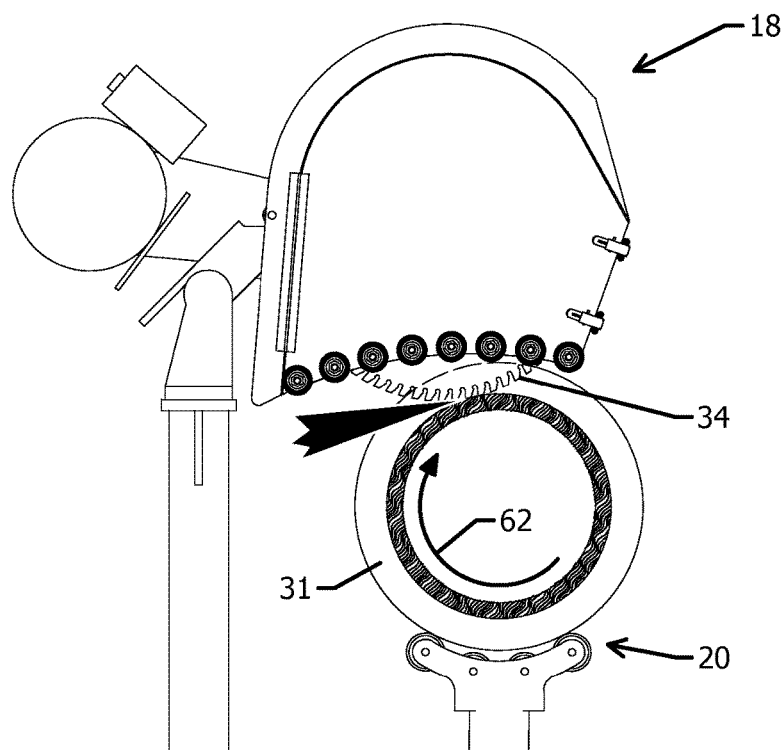
FIG. 9A an elevational view of a rotating cutting apparatus with a material to be cut with a rotating saw in accord with one possible embodiment of the present invention.
Figure 9B:
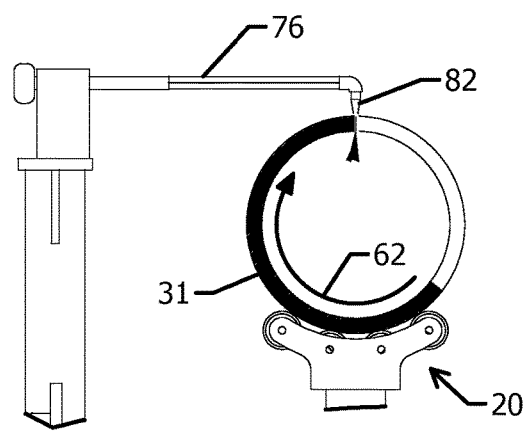
FIG. 9B an elevational view of a cutting apparatus with a material to be cut with a blow torch in accord with one possible embodiment of the present invention.
Figure 9C:
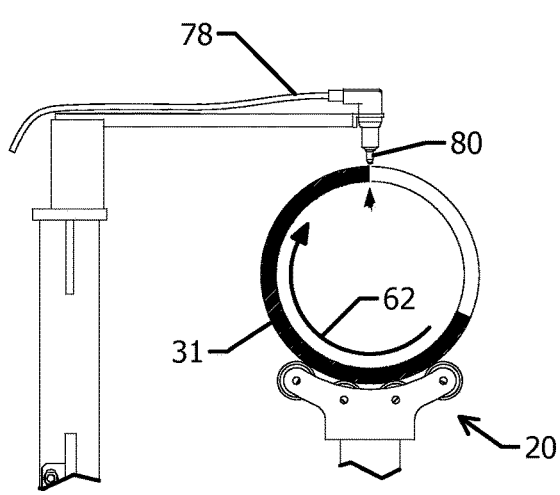
FIG. 9C an elevational view of a cutting apparatus with a material to be cut with a hydraulic cutter in accord with one possible embodiment of the present invention.

Referring now to FIGS. 9A-9C, which show alternate embodiments of the cutting apparatus 10, wherein each embodiment incorporates alternate means of cutting material 31. Specifically, FIG. 9A depicts a rotating saw blade 34 for cutting cylindrical material 31, as discussed hereinbefore. FIG. 9B depicts a cutting torch assembly 76 comprising a nozzle 82, which can cut the material 31. FIG. 9C depicts a hydraulic cutting assembly 78 comprising a nozzle 80 for hydraulically cutting material 31. In each example in this embodiment, material 31 is rotated in the direction indicated by arrow 62 and is supported by roller supports 20. Although FIGS. 9A, 9B, and 9C depict specific means of cutting the cylindrical material 31, other means of cutting the cylindrical material 31 can be used as part of the cutting apparatus 10. For example a plasma cutter or a laser cutter can be mounted to the support post 41 to cut the cylindrical material 31.

FIGS. 10A1-10C1 and FIGS. 10A2-10C2 illustrate the operation of the cut material handler 900 in accord with one possible embodiment of the present disclosure. Generally, the depicted material handler 900 can be utilized to move the cut portion 934 of the material from the support rollers 20 of the cutting apparatus 10 to the ground or a container (not shown) positioned adjacent to the cutting apparatus 10.

Specifically, FIG. 10A1 shows uncut portion 930 of the material supported by the support rollers 22 (e.g., first set of rollers) and still attached to the spinning clamp 12. The Figure also depicts a cut portion of material 934 supported by the support rollers 20 (e.g., second set of rollers), wherein the cutter assembly 18 was utilized to cut the material into the uncut portion 930 and the cut or severed portion 934 of the material. After making a cut 932 with cutting apparatus 18, material support rollers 22 can support the uncut material portion 930, while the cut material support rollers 20 can exclusively support the cut portion 934. The uncut portion of material 930 is still shown attached to the spinning clamp 12. FIGS. 10A1 and 10A2, further depict the offset shaft 916, in a lower vertical position, in which the offset shaft does not engage the interior surface 933 of cut portion 934 of the material. FIG. 10A1 further depicts the shaft 916 of the material handler 900 inserted through the cut portion 934 of the material.

In FIGS. 10B1 and 10B2, the offset shaft 916 is shown rotated about 180 degrees and thereby moved to its upper position with respect to the motor output shaft 914, rotated by motor 912. Motor output shaft 914 is shown rotated about 180 degrees, as indicated by arrow 917, to move the offset shaft 916 to its upper position to engage the interior surface 933 of portion 934. Accordingly, cut portion of material 934 is raised upwardly, off of the support rollers 20, as indicated by arrow 940. FIG. 10B1 shows the uncut portion 930 still attached to the spinning clamp 12.

Referring now to FIGS. 10C1 and 10C2, which shows one end of the rotating arm 910 being connected to the gear box 924 and the motor assembly 926, which can rotate the arm 910 downwardly, as indicated by arrow 942, so that the cut portion 934 can be laid on the ground 936. The cut portion 934 can be very heavy, which would otherwise require a crane or a forklift to move the cut portion off of the cutting apparatus 10.

It should be noted that all components of the cutting apparatus 10 discussed hereinbefore, including, but not limited to, the axial positioning mechanism 26, the support mechanism 48, the rotating saw assembly 18, and the cut material handler 900, can be computer controlled and operate as described hereinbefore by programmed control. The cutting apparatus can comprise a controller 90 (shown in FIG. 1A), and a plurality of sensors (not shown), wherein the controller 90 can be programmed to receive inputs form strategically placed sensors and to generate outputs to various motors and linear actuators to fully or partially automate the cutting process as well as the unloading of the cut material 934. In an embodiment of the cutting apparatus 10, the entire piece of material can automatically be cut to preset lengths and unloaded according to programming.

Many additional changes in the details, components, steps, and organization of the apparatus and method, herein described and illustrated to explain the nature of the invention, may be made by those skilled in the art within the principle and scope of the presently preferred embodiment described herein. It is therefore understood that within the scope of the appended claims, the invention may be practiced otherwise than as specifically described.

What is claimed is:

1. A cutting apparatus for cutting a material, comprising:
   a frame assembly;
   a rotating chuck for holding and rotating the material, wherein the rotating chuck is mounted to the frame assembly, wherein the rotating chuck comprises an axis of rotation, and wherein the rotating chuck moves axially along the axis of rotation;
   a material cutter mounted to the frame assembly; and
   a plurality of rollers for supporting the material during cutting operations, wherein the plurality of rollers is mounted to the frame assembly with at least one bracket, wherein the at least one bracket containing the plurality of rollers is vertically movable with respect to the frame assembly by moving a shaft to accommodate different sizes of the material.

2. The cutting apparatus of claim 1, wherein the material cutter is mounted to a vertical member that is mounted to the frame assembly, wherein the vertical member is vertically movable with respect to the frame assembly.

3. The cutting apparatus of claim 1, wherein the plurality of rollers comprise a first group of rollers and a second group of rollers, wherein the first group of rollers is axially spaced from the second group of rollers.

4. The cutting apparatus of claim 3, wherein the first group of rollers is positioned on a side of the material cutter to support a portion of the material that is held by the rotating chuck, wherein the second group of rollers is positioned on an opposite side of the material cutter to support a portion of the material that is severed by the material cutter.

5. The cutting apparatus of claim 1, wherein the cutting apparatus further comprises a guard movable to cover or expose the material cutter, wherein the guard comprises a plurality of additional rollers that contact the material during cutting operations.

6. The cutting apparatus of claim 1, further comprising a material moving assembly positioned on an opposite side of the material cutter from the rotating chuck, wherein the material moving assembly comprises an arm insertable into an interior portion of the material, wherein the arm lifts and moves the material.

7. The cutting apparatus of claim 1, wherein the plurality of rollers are positioned between the rotating chuck and the material cutter.

8. The cutting apparatus of claim 2, wherein the vertical member supporting the material cutter and the shaft supporting the plurality of rollers are linked with a lever arm, and wherein the material cutter and the plurality of rollers are simultaneously movable.

9. A method for cutting a material, comprising the steps of:
   providing a cutting apparatus for cutting the material, wherein the cutting apparatus comprises a frame assembly, a rotatable chuck mounted to the frame, a cutter mounted to the frame, and a plurality of rotating members within at least one bracket mounted to the frame;
   gripping the material with the rotatable chuck;
   moving the rotatable chuck axially along the axis of rotation to position the material in a desired position relative to the cutter;
   moving a shaft connected to the at least one bracket vertically with respect to the frame assembly to contact or vertically support the material with the plurality of rotating members;
   rotating the rotatable chuck to rotate the material about an axis of rotation as the material is supported by the plurality of rotating members; and
   cutting the material with the cutter, wherein a portion of the material remains gripped by the rotatable chuck and another portion of the material is severed by the cutter.

10. The method of claim 9, further comprising the step of moving a support member vertically into contact with the material to support the material as the material is moving axially along the axis of rotation.

11. The method of claim 9, further comprising the step of moving the cutter vertically to position the cutter adjacent to the material for cutting.

12. The method of claim 9, further comprising the step of:
    supporting the gripped portion of the material by a first set of rotating members of the plurality of rotating members; and
    supporting the severed portion of the material by a second set of rotating members of the plurality of rotating members, wherein the second set of rotating members is spaced from the first set of rotating members along the axis of rotation; and
    removing the severed portion of the material from the second set of rotating members.

13. The method of claim 9, further comprising the steps of:
    providing a cover for the cutter, wherein the cover comprises friction reducing elements; and
    moving the cutter and the friction reducing elements into contact with the material as the material is rotating.

14. The method of claim 9, further comprising the steps of:
    inserting an arm into an interior portion of a cut portion of the material; and
    moving the arm to move the cut portion of the material away from the plurality of rotating members.

15. The method of claim 9, further comprising the steps of simultaneously moving the cutter and the plurality of rotating members toward the axis of rotation or toward the material.

16. A cutting apparatus for cutting a material, comprising:
- a chuck for holding and rotating material, wherein the chuck rotates about an axis of rotation, wherein the chuck is movable along the axis of rotation;
- a cutting element for cutting the material, wherein the cutting element is movable vertically atop a vertical member for positioning the cutting element adjacent to the material for cutting; and
- a first plurality of rotating elements for supporting the material during cutting operations, wherein the first plurality of rotating elements are mounted within at least one bracket, wherein the at least one bracket is connected to a shaft, wherein the shaft is movable vertically to align the material with the chuck.

17. A cutting apparatus of claim 16, further comprising a support member positioned between the chuck and the plurality of rotating elements.

18. The cutting apparatus of claim 16, wherein the first plurality of rotating elements are positioned between the chuck and the cutting element.

19. The cutting apparatus of claim 16, further comprising a second plurality of rotating elements spaced from the first plurality of rolling elements, wherein the second plurality of rotating elements is positioned on a side of the cutting element opposite the first plurality of rotating elements.

20. The cutting apparatus of claim 16, further comprising a cover positioned about the cutting element, wherein the cover comprises a movable portion that is movable to expose the cutting element, wherein the cover portion, the movable portion, or combinations thereof comprise an additional plurality of rotating elements that contact the material during cutting operations.

21. The cutting apparatus of claim 17, further comprises a lever arm having first and second ends, the first end attached to the vertical member and capable of moving the cutting element, the second end attached to the shaft and and capable of moving the first plurality of rotating elements.

22. The cutting apparatus of claim 21, wherein the lever arm moves the cutting element and the plurality of rotating elements away from each other in opposite directions.

23. The cutting apparatus of claim 22, wherein the movement of the cutting element and the plurality of rotating elements is in equal proportion relative to one another.

* * * * *